Oct. 2, 1934.  N. BORRESEN  1,975,190
THERMOSTAT
Filed Jan. 6, 1933
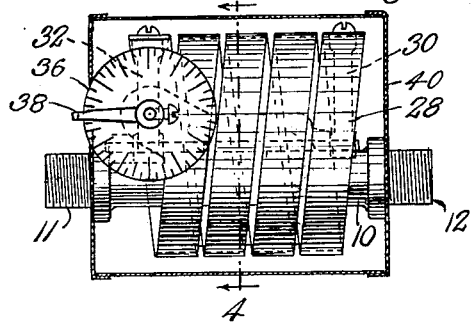
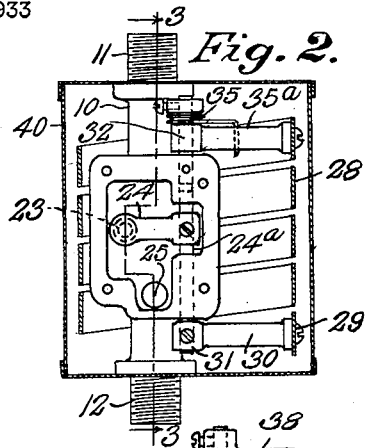
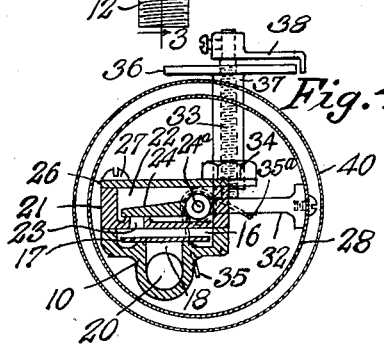
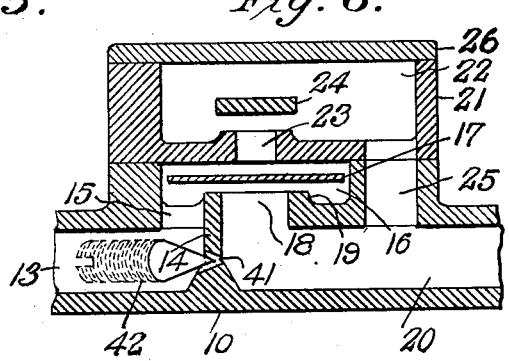
Nico Borresen
INVENTOR.

Patented Oct. 2, 1934

1,975,190

UNITED STATES PATENT OFFICE 1,975,190

THERMOSTAT

Nico Borresen, Los Angeles, Calif.

Application January 6, 1933, Serial No. 650,455

6 Claims. (Cl. 236—80)

My invention relates to valves for controlling the flow of fluids and has particular reference to a thermostatically controlled valve for automatically controlling the supply of fluids to fuel burners and the like in accordance with variations in temperatures.

Valves for automatically controlling the passage of fluids through pipe lines and the like, particularly those which are adapted to supply fluid fuels to stoves, burners, heaters and the like, in accordance with variations in temperature changes, or in accordance with variations in other conditions requiring an accurate control of the amount of fuel supplied to such burners, requires that the valve must be quickly responsive to relatively small variations in the condition to be controlled, while at the same time it is essential that the action of the valve be positive and sure in its operation. Particularly where such valves are to be used for the control of gas supplied to stoves, burners, or the like, it is essential that the valve shall not only be positive in its action but that it should operate with a relatively snap action so as to insure complete seating of the valves as soon as the desired temperature condition, or other condition, has been achieved.

It is an object of my invention to provide a valve for controlling the passage of gas, or other fluid, in a pipe line in which the pressure of the gas or other fluid in the line is employed to accurately and positively seat the valve in closed position.

Another object of the invention is to provide a valve for gas, or other fluids, in which a main valve is employed for controlling the supply of fluid which valve operates in a valve chamber which may be opened and closed by an auxiliary valve so that the main valve may operate rapidly when the valve chamber is closed independent of the rapidity with which the auxiliary valve may operate.

Another object of the invention is to provide a valve of the character set forth in the preceding paragraph, in which the auxiliary valve may be controlled in response to variations in temperature conditions by means of a suitable thermostat which may operate the auxiliary valve slowly in accordance with slow changes in temperature, but in which the auxiliary valve, once closed, causes a rapid and positive operation of the main valve.

Another object of the invention is to provide a valve structure as set forth in the preceding paragraph in which a relatively long thermostatic element may be employed for controlling the operation of the auxiliary valve, but which may be made in relatively compact form by making the long thermostatic element in the form of a helix.

Another object of the invention is to provide a valve structure in which a main valve is employed to normally seat in closed position under the influence of gravity and in which the pressure of fluid flowing into the valve structure will lift the valve from its seat.

Other objects and advantages will be apparent from a study of the following specifications, read in connection with the accompanying drawing, wherein Figure 1 is a side, elevational view of a valve constructed in accordance with my invention, showing a portion of the casing or housing surrounding the valve removed to illustrate the apparatus within the interior of such housing;

Figure 2 is a sectional view, taken along line 2—2 of Fig. 3;

Figure 3 is a vertical sectional view taken along line 3—3 of Fig. 2;

Figure 4 is a vertical sectional view taken along line 4—4 of Fig. 1;

Figure 5 is a detail plan view of the fluid conduit and main valve chamber employed with my invention; and Figure 6 is an enlarged vertical sectional view taken along line 6—6 of Figure 5.

Referring to the drawing, I have illustrated a valve construction comprising a fluid conduit 10 which may be interposed in a fuel or other fluid supply line by connecting the same in such line through the agency of threaded nipples 11 and 12 formed on opposite ends of the conduit 10. From the inlet end of the conduit adjacent the nipple 11, an inlet passage 13 extends partially through the conduit 10 terminating in a wall or baffle 14 which extends entirely across the conduit 10. On the inlet side of the baffle or wall 14 I provide an inlet port 15 which communicates with a main valve chamber 16 formed preferably in the same casting in which the conduit 10 is formed and arranged immediately above the conduit 10. The main valve chamber 16 provides a relatively large housing in which a plate or disc valve 17 is located and which is preferably not attached to the walls or any other portion of the valve chamber, but freely floats in said chamber under the influence of fluid which may flow into the chamber through the inlet port 15. The chamber 16 is provided with an outlet port 18 preferably formed in the lower wall of the valve chamber 16, the material surrounding the port 18 preferably extending upwardly into the valve chamber to form a short flange 19 constituting the valve seat upon which the valve disc or float 17 may rest under the influence of gravity so that when no fluid is flowing into the passage 15 the disc or plate valve 17 will close the outlet port 19. The outlet port 19 communicates directly with an outlet passage 20 extending through the conduit 10 toward the opposite threaded end of the nipple 12.

It will be noted from an inspection of Figures 3 and 6 that the disc or plate valve 17 is of such extent that a portion thereof lies immediately above the inlet port 15 so that fluids flowing into and through the inlet port 15 will produce a lifting effect upon the disc valve 17 tending to lift this valve from its seat over the outlet port 18.

The upper wall of the valve chamber 16 is preferably formed by means of a box-like auxiliary valve chamber casing 21, the interior of which defines an auxiliary valve chamber 22 communicating directly with the main valve chamber 16 through an opening or auxiliary valve port 23 in the lower wall of the auxiliary valve chamber casing. Mounted within the auxiliary valve chamber 22 is an auxiliary valve 24, preferably rigidly mounted upon a shaft 24a which is in turn journaled in the side walls of the auxiliary valve chamber casing 21 so that the auxiliary valve may be moved in a counterclockwise direction to seat upon the auxiliary valve port 23, or may be moved in a clockwise direction to open said auxiliary port.

With the construction thus far described it will be apparent that whenever the auxiliary valve is open fluid may flow into the inlet passage 13 and impinge upon the extending portion of the disc valve 17 lifting the valve from its seating engagement with the outlet port 18 and permitting fluids to flow directly into the outlet passage 20, but whenever the auxiliary valve 24 is closed upon its port 23 the pressure of fluid flowing into the main valve chamber 16 will create a pressure above the disc valve 17 and allow this valve to seat by gravity, while further pressure created in the valve chamber 16 by the inflowing fluid will press the disc valve 17 tightly upon the outlet port 18. It will also be observed that the opening or closing of the main valve disc 17 will occur with an instantaneous or snap action wholly independent of the time element required to open or close the auxiliary valve port 23, since until the auxiliary valve 24 is completely closed little or no pressure is created in the valve chamber 16 above the disc valve 17, but as soon as the auxiliary valve 24 seats upon the port 23 an instantaneous building-up of pressure will occur and will tightly close the main valve 17.

The auxiliary valve chamber 22 is preferably provided with a normal outlet port 25 which communicates directly with the outlet passage 20 so that any fluid which accumulates in the auxiliary valve chamber may pass directly out through the outlet passage and hence when the auxiliary valve 24 is open fluid may freely pass to the outlet passage 20 without creating any pressure above the main valve 17. The auxiliary valve chamber 22 may be closed at its top in any suitable manner, though I prefer that the top of the valve chamber 22 be formed by a suitable plate 26 which may be attached to the casing 21 by means of screws 27.

While the auxiliary valve 24 may be operated in any suitable manner and may be controlled in response to any desired condition under which the main valve is desired to operate, such construction is particularly adapted for control by changes in temperature conditions by connecting a suitable thermostatic element 28 to operate the shaft 24a upon which the auxiliary valve 24 is fixed. This thermostatic element 28 may be made in any suitable form so long as its expansion under increase in temperature moves the auxiliary valve 24 toward closing position and by reason of the construction of the main and auxiliary valves such movement may be relatively slight without causing any operation of the main valve but once the motion is completed the main valve will instantly operate.

I prefer that the thermostatic element 28 be relatively long so as to permit a relatively large amount of movement (increase or decrease of length under expansion and contraction) thereof, to be employed to correspondingly produce a relatively large amount of movement of the auxiliary valve 24 under relatively small changes in temperature, and for this purpose I prefer to employ a thermostatic element preferably formed of bimetallic material made in the form of a relatively long ribbon which, for compactness, may be wound in the shape of a helix, one end 29 of which is connected to a crankarm 30 which is in turn fixed as at 31 upon the end of the shaft 24a, while the other end of the thermostatic element 28 may be connected to any suitable stationary part of the mechanism. Thus the thermostatic element may be selected of such material and such length as to produce the desired amount of movement for opening and closing the auxiliary valve under any predetermined difference in temperature conditions.

In order to readily adapt my valve to different temperature conditions which are desired to be controlled, I prefer to secure the fixed end of the thermostatic element 28 to a second crankarm 32, which is in turn pivotally mounted in any suitable manner, as, for example, rotatably upon the shaft 24a, so that the crankarm 32 may be adjusted relative to the stationary portions of the structure to change the setting of the thermostatic element for different temperature conditions.

In order to readily adjust the thermostatic element, I prefer to provide an adjusting screw 33 suitably threaded as indicated at 34 upon a stationary portion of the structure, as, for example, the auxiliary valve chamber cover 26, the screw 33 being mounted in offset relation to the pivotal mounting of the crankarm 32. Thus by moving the screw 33 downwardly the crankarm 32 may be depressed, requiring a greater amount of rise in temperature for accomplishing the closing movement of the auxiliary valve 24, while when the screw 33 is raised a lesser amount of rise in temperature is required to close the valve 24. Preferably the crankarm 32 is normally urged against the end of the screw 33 by means of a suitable spring 35, one end of which bears upon any stationary portion of the mechanism, such as the conduit 10, while the opposite end 35a of the spring 35 bears upon the crankarm 32 and holds the same in tight engagement with the screw 33.

If desired, a dial or other indicator denoting the setting of the thermostat, may be employed. Such arrangement is illustrated herein as being formed by a dial 36 constituting a flat plate which may be formed as an integral part of the stationary threaded member 37 employed for threadedly mounting the screw 33, while the upper end of the screw 33 may be provided with a suitable pointer 38 which, as it is moved about the dial 36 as the screw 33 is moved, may be compared with suitable calibrations 39 upon the dial to indicate the desired setting for temperature conditions.

With the construction herein described, the valve is particularly adapted for use in controlling the passage of fuels to burners in accordance with the temperature conditions of the furnace, room, or other location in which temperature control is desired. Such use merely requires that my valve be interposed in the fuel supply line to the burner so that the thermostat 28 is exposed to the temperature of the room or compartment which is desired to be controlled. The entire mechanism may be enclosed within a suitable housing 40 which may be formed of any suitable material, preferably perforated so as to permit the surrounding atmosphere to readily contact the thermostat 28 and thus directly affect the same.

While my valve may be used with any suitable type of pilot for relighting the fuel upon the reopening of the main valve, the valve of my construction may be readily adapted both to serve as a main valve and a pilot by providing a passage 41 through the baffle or wall 14 to directly intercommunicate the inlet passage 13 and the outlet passage 20. Such opening 41 may be provided with a suitable needle valve 42 which may be regulated to limit the flow of fluid through the passage 41 to regulate the pilot flame which will remain lighted when the main supply of fuel is cut off by the valve 17.

While I have shown and described the preferred embodiment of my invention, it is to be understood that I do not wish to be limited to any of the details of construction shown herein, except as defined in the appended claims.

I claim:

1. In a gas control valve, a gas conduit having an inlet and an outlet, a main valve chamber formed above said conduit having a pair of ports through the bottom thereof, one communicating with said inlet and the other communicating with said outlet, a thin disc plate valve having a dimension considerably less than the cross-sectional area of said main valve chamber resting upon said outlet port under the influence of gravity to close the same, said plate having a portion thereof extending over said inlet port to subject said plate to a lifting force under pressure of gas flowing into said inlet port, a third port in said chamber above said plate, and an auxiliary valve for opening and closing said third port.

2. In a gas control valve, a gas conduit having an inlet passage and an outlet passage and having a valve chamber formed thereon above said passages communicating through an inlet port and outlet port in the bottom thereof with both said inlet and said outlet passages, a main valve in said valve chamber comprising a thin plate of less dimension than the cross-sectional area of said valve chamber, freely movable therein and resting upon said outlet port under the influence of gravity to close said port and said plate having a portion thereof extending over said inlet port whereby fluid entering said inlet port lifts said plate, a third port in said valve chamber above said plate, and an auxiliary valve for closing said port to allow fluid in said valve chamber to apply a closing pressure to said main valve.

3. In a gas control valve, a gas conduit having an inlet passage and an outlet passage and a valve chamber formed above said conduit, an inlet port communicating with said valve chamber to project gas passing therethrough in a substantially vertical direction, an outlet port extending from the bottom of said valve chamber and communicating with said outlet passage, a thin disc plate valve of less diameter than the cross-sectional area of the interior of said valve chamber and free in said valve chamber resting upon and closing said outlet port under the influence of gravity, and extending above said inlet port, an auxiliary port in said valve chamber above said valve, an auxiliary valve chamber above said main valve chamber and having an outlet communicating directly with said outlet passage, and an auxiliary valve in said auxiliary valve chamber for opening and closing said auxiliary port.

4. In a fluid valve, a valve conduit having an inlet passage and an outlet passage and having a valve chamber formed thereon communicating through an inlet port and outlet port with both said inlet and said outlet passages, a main valve in said valve chamber for closing said outlet port under the influence of gravity and extending over said inlet port to be lifted by fluid entering said inlet port, a third port in said valve chamber, and an auxiliary valve for opening and closing said third port, means pivotally mounting said auxiliary valve for movement toward and away from said port, a thermostatic element in the form of a helix, the axis of which is parallel to the axis of said pivotal mounting means, connected to said auxiliary valve to pivotally move said valve relative to its port under the influence of temperature changes.

5. In a fluid valve, a valve conduit having an inlet passage and an outlet passage and having a valve chamber formed thereon communicating through an inlet port and outlet port with both said inlet and said outlet passages, a main valve in said valve chamber for closing said outlet port under the influence of gravity and extending over said inlet port to be lifted by fluid entering said inlet port, a third port in said valve chamber, an auxiliary valve for opening and closing said third port, including a shaft fixed to said auxiliary valve, a thermostatic element in the form of a helix, the axis of which is parallel to the axis of said shaft, a crank connecting one end of said helix to said shaft, and means fixedly connecting the other end of said helix relative to said conduit.

6. In a fluid valve, a valve conduit having an inlet passage and an outlet passage and having a valve chamber formed thereon communicating through an inlet port and outlet port with both said inlet and said outlet passages, a main valve in said valve chamber for closing said outlet port, under the influence of gravity and extending over said inlet port to be lifted by fluid entering said inlet port, a third port in said valve chamber, an auxiliary valve for opening and closing said third port, including a shaft fixed to said auxiliary valve, a thermostatic element in the form of a helix, the axis of which is parallel to the axis of said shaft, a crank connecting one end of said helix to said shaft, a second crank pivotally mounted with respect to said conduit and having one end thereof connecting with the other end of said helix, and means for adjusting the position of said second crank to vary the temperature required to close said auxiliary valve.

NICO BORRESEN.